(12) United States Patent
Flaig (10) Patent No.: US 10,746,938 B2
(45) Date of Patent: Aug. 18, 2020

(54) FIBER OPTIC CONNECTORS (71) Applicant: CommScope Technologies LLC, Hickory, NC (US)

(72) Inventor: Robert Charles Flaig, Lancaster, PA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/192,006

(22) Filed: Nov. 15, 2018

(65) Prior Publication Data
US 2019/0154923 A1 May 23, 2019

Related U.S. Application Data (60) Provisional application No. 62/587,855, filed on Nov. 17, 2017.

(51) Int. Cl.
*G02B 6/38* (2006.01)
*G02B 6/42* (2006.01)

(52) U.S. Cl.
CPC ......... *G02B 6/3821* (2013.01); *G02B 6/3833* (2013.01); *G02B 6/3878* (2013.01); *G02B 6/3897* (2013.01); *G02B 6/3893* (2013.01); *G02B 6/4292* (2013.01)

(58) Field of Classification Search
CPC ... G02B 6/3897; G02B 6/3821; G02B 6/3833
See application file for complete search history.

(56) References Cited

U.S. PATENT DOCUMENTS

| 4,787,706 | A |  | 11/1988 | Cannon, Jr. et al. |
| 5,692,080 | A |  | 11/1997 | Lu |
| 5,915,058 | A |  | 6/1999 | Clairardin et al. |
| 5,960,138 | A |  | 9/1999 | Shimoji et al. |
| 6,302,591 | B1 | * | 10/2001 | Nagaoka ............... G02B 6/3869 385/59 |
| 6,357,928 | B1 | * | 3/2002 | Haley .................. G02B 6/3878 385/59 |
| 6,443,629 | B1 |  | 9/2002 | Novacoski et al. |
| 6,789,950 | B1 |  | 9/2004 | Loder et al. |
| 6,824,311 | B2 |  | 11/2004 | Chen et al. |
| 6,981,803 | B2 |  | 1/2006 | Grzegorzewska et al. |
| RE40,622 | E |  | 1/2009 | Lu |
| 7,785,019 | B2 |  | 8/2010 | Lewallen et al. |
| 9,383,539 | B2 |  | 7/2016 | Hill et al. |
| 9,442,257 | B2 |  | 9/2016 | Lu |

(Continued)

FOREIGN PATENT DOCUMENTS

EP     0 927 899 A1     7/1999

OTHER PUBLICATIONS

Senko Advanced Components; Next Generation Connector; 2 pages.

*Primary Examiner* — Thomas A Hollweg
*Assistant Examiner* — Mary A El-Shammaa
(74) *Attorney, Agent, or Firm* — Merchant & Gould P.C.

(57) ABSTRACT

A fiber optic connector includes a ferrule assembly at least partially disposed within a connector housing. The ferrules project distally from the connector housing and are biased in the distal direction by a common ferrule spring. Proximal ends of the ferrules and the ferrule spring are disposed within the same interior cavity of the connector housing. In certain examples, no portion of the connector housing extends between ferrule hubs supporting the ferrules.

19 Claims, 10 Drawing Sheets (56) References Cited

U.S. PATENT DOCUMENTS

| | | | |
|---|---|---|---|
| 2012/0257859 A1* | 10/2012 | Nhep | G02B 6/3887 |
| | | | 385/81 |
| 2014/0153878 A1* | 6/2014 | Mullaney | G02B 6/3821 |
| | | | 385/78 |
| 2015/0110449 A1* | 4/2015 | Nhep | G02B 6/3858 |
| | | | 385/81 |
| 2016/0004016 A1* | 1/2016 | Zimmel | G02B 6/3885 |
| | | | 385/59 |
| 2016/0187591 A1 | 6/2016 | Fortusini et al. | |
| 2016/0252682 A1* | 9/2016 | Watte | G02B 6/3823 |
| | | | 385/65 |
| 2016/0274310 A1* | 9/2016 | Li | G02B 6/3821 |
| 2017/0031106 A1 | 2/2017 | Takano et al. | |
| 2017/0160494 A1 | 6/2017 | Watanabe | |
| 2017/0227719 A1* | 8/2017 | Zimmel | G02B 6/3879 |
| 2018/0031775 A1* | 2/2018 | Gurreri | G02B 6/3817 |

* cited by examiner

FIBER OPTIC CONNECTORS

CROSS REFERENCE TO RELATED APPLICATION

This application claims the benefit of U.S. Provisional Application No. 62/587,855, filed Nov. 17, 2017, and titled "Fiber Optic Connectors," the disclosure of which is hereby incorporated herein by reference.

BACKGROUND

Background

The present disclosure is directed to optical fiber communication systems and, more specifically, to fiber optic connectors used in optical fiber communication systems.

Fiber optic communication systems can employ a network of fiber optic cables to transmit data and/or voice signals over distances. Fiber optic connectors allow optical fibers to be quickly optically connected without requiring a splice. Fiber optic connectors can be used to optically interconnect different lengths of optical fiber, and can also be used to interconnect lengths of optical fiber to passive and active equipment. Some known fiber optic connectors include a ferrule assembly supported at a distal end of a connector housing. The ferrule assembly functions to support an end portion of at least one optical fiber (in the case of a multi-fiber ferrule, the ends of multiple fibers are supported). A ferrule of the ferrule assembly has a distal end face at which a polished end of the optical fiber is located. When two fiber optic connectors are interconnected, the distal end faces of the ferrules abut one another. With the fiber optic connectors connected, their respective optical fibers are coaxially aligned such that the end faces of the optical fibers directly oppose one another. As such, an optical signal can be transmitted from optical fiber to optical fiber through the aligned end faces of the optical fibers. For many fiber optic connector styles, alignment between two fiber optic connectors is provided through the use of an intermediate fiber optic adapter.

SUMMARY

The present disclosure is directed to a fiber optic connector that enables a fiber optic cable to be optically connected to equipment and/or another fiber optic cable. The fiber optic connector includes a ferrule assembly at least partially disposed within a connector housing. A plurality of ferrules project distally outward from the connector housing and are biased in the distal direction by a common ferrule spring. Proximal ends of the ferrules and the ferrule spring are disposed within the connector housing within the same interior cavity.

In certain implementations, each ferrule is supported by a discrete hub which engages with the ferrule spring.

In certain implementations, the connector housing does not separate the discrete hubs. In certain examples, no portion of the connector housing extends between the discrete hubs.

In certain implementations, each of the ferrules can be moved independent of the other ferrules.

In some implementations, the fiber optic connector is a duplex connector having two ferrules. In some examples, a connector latch is aligned with the two ferrules. In other examples, the connector latch is disposed alongside the two ferrules. In other implementations, the fiber optic connector is a quadruplex connector having four ferrules.

In some implementations, the ferrule spring contacts a majority of a perimeter of each ferrule hub. In other implementations, the ferrule spring contacts no more than half of the perimeter of each ferrule hub.

The above summary is not intended to describe each embodiment or every implementation. A more complete understanding will become apparent and appreciated by referring to the following detailed description and claims in conjunction with the accompanying drawings.

DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure is directed to a fiber optic connector that enables a fiber optic cable to be optically connected to equipment and/or another fiber optic cable. The fiber optic connector includes a ferrule assembly at least partially disposed within a connector housing. A plurality of ferrules project distally outward from the connector housing and are biased in the distal direction by a ferrule spring. Each ferrule is supported by a discrete hub which engages with the ferrule spring.

Each ferrule hub and the ferrule spring are disposed within the connector housing and in a single interior cavity. As such, the ferrule hubs are positioned adjacent to one another so that the size of the connector may be reduced. Thus, enabling more connectors to be used in a smaller space. The ferrule spring surrounds at least a portion of each ferrule hub so that each hub is engaged with the spring. As such, movement of each ferrule is partially independent from the other ferrules so that the end faces of the ferrule can be offset from each other and not perfectly co-planer, while still making contact in a connection. The flex of the ferrule spring enables partial independent movement of each ferrule hub even through all of the ferrule hubs are engaged and biased by the same ferrule spring.

Figure 1:
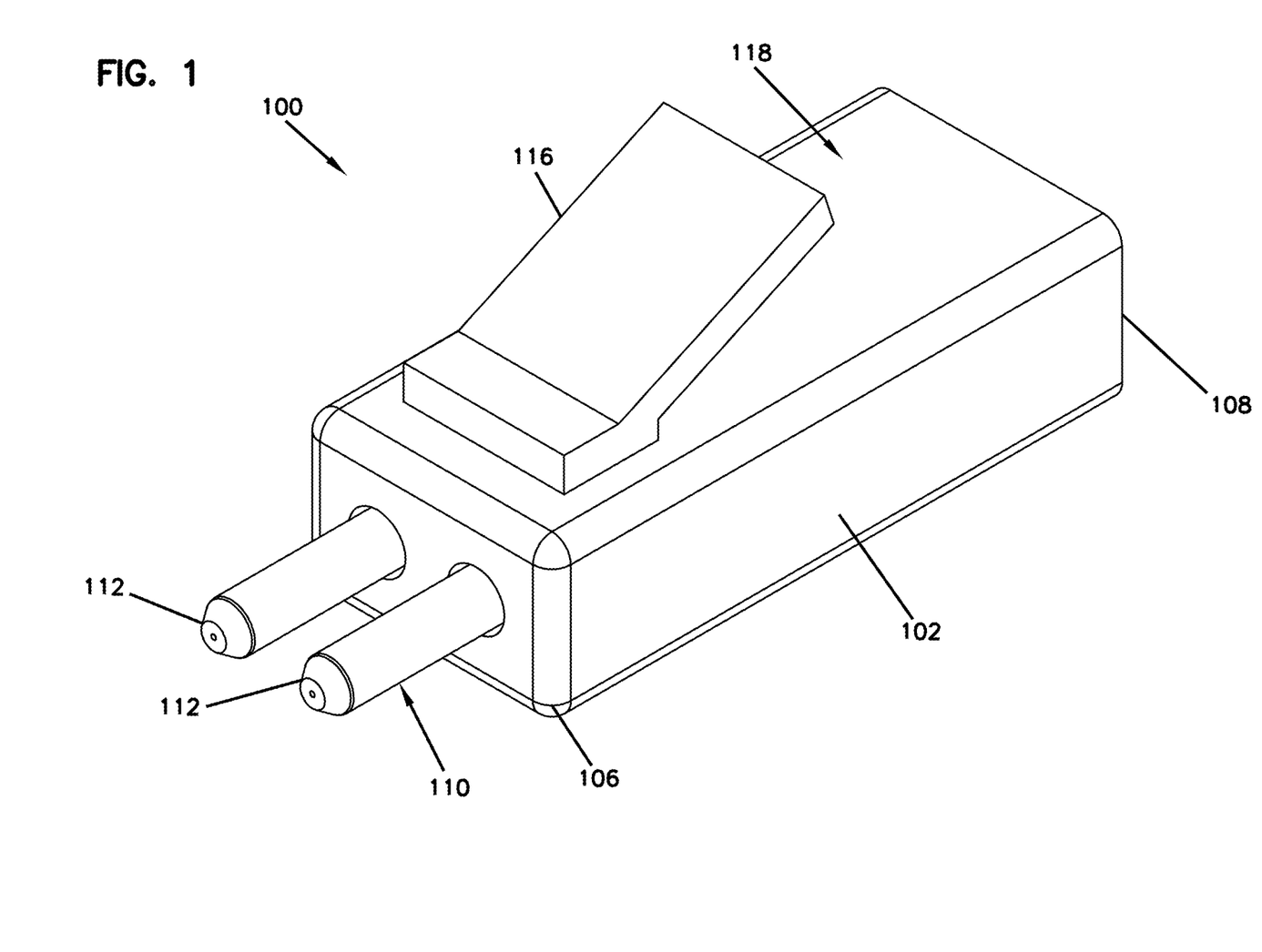
FIG. 1 is a perspective view of an example fiber optic connector configured in accordance with the principles of the present disclosure.

FIG. 1 is a perspective view of an example fiber optic connector 100. The fiber optic connector 100 includes a connector housing 102 defining a longitudinal axis 104 (shown in FIG. 6) and having a distal end 106 and an opposite proximal end 108. In some examples, the connector housing 102 may be formed from a molded plastic. One or more ferrule assemblies 110 are partially disposed within the connector housing 102 with one or more ferrules 112 projecting out of the distal end 106. The distal end 106 of the connector housing 102 is open so that the fiber optic connector 100 may receive an end of a fiber optic cable 114 (shown in FIG. 6) so that optical fibers 142 (also shown in FIG. 6) therein are secured to and supported by the ferrule assemblies 110. The fiber optic connector 100 enables two ends of fiber optic cables to be optically connected together, for example, via an adapter (not shown) or the fiber optic cable to be optically connected to equipment. In some examples, the fiber optic connector 100 may include a latch 116 extending from an exterior surface 118 of the connector housing 102. The latch 116 enables the fiber optic connector 100 to be removably locked in place within the adapter and/or equipment. In other examples, the connector may include two or more latches that are squeezed together to release the connector. In further examples, the latch may be disposed on the adapter so as to secure the connector thereto. To unlock the fiber optic connector 100, the latch 116 may be depressed to release the fiber optic connector 100 from within the adapter and/or equipment. In alternative examples, the connector 100 may be an SC-type connector or other type such that the latch may be a push-pull coupling.

Figure 2:
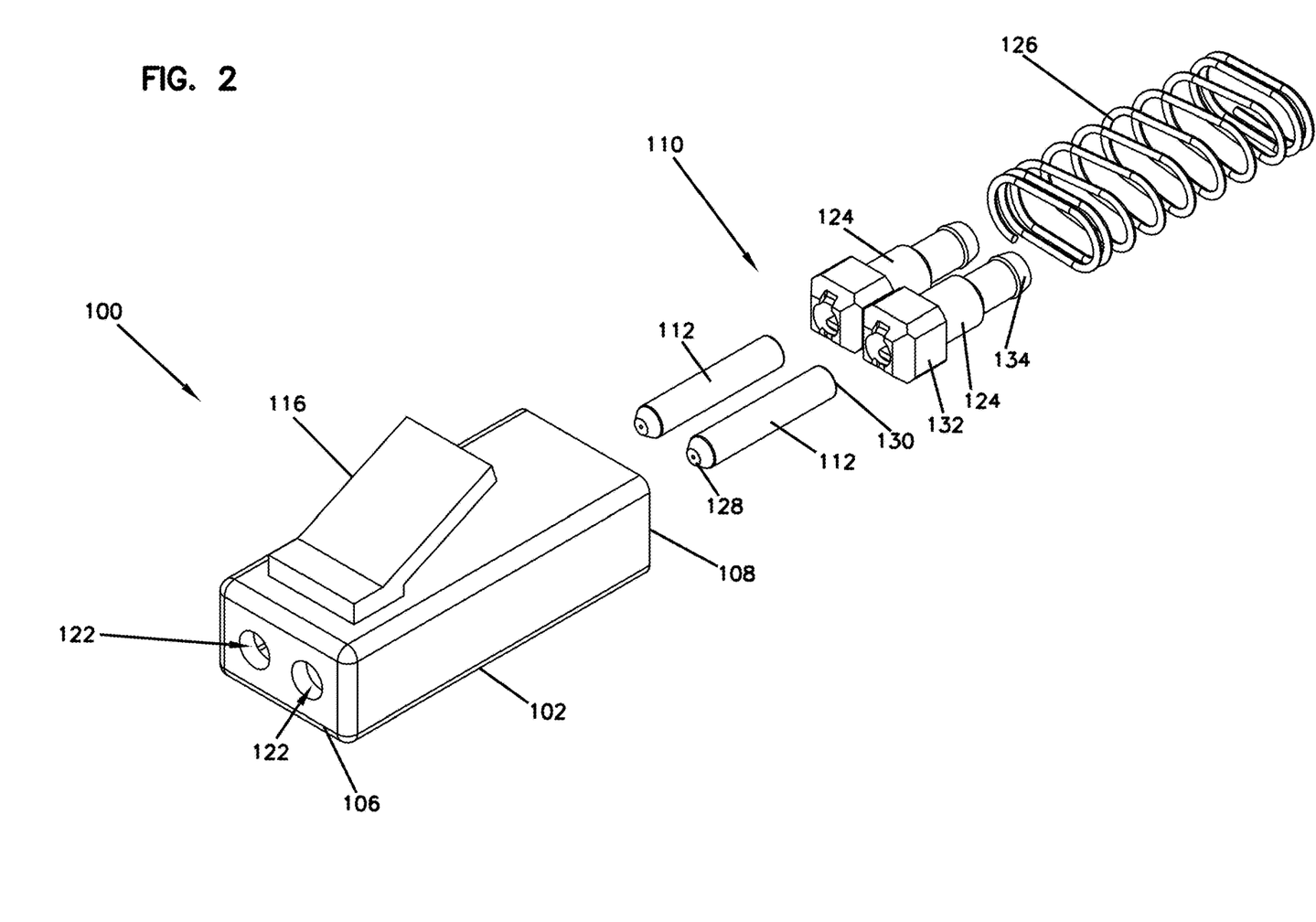
FIG. 2 is an exploded perspective view of the fiber optic connector shown in FIG. 1.
Figure 3:
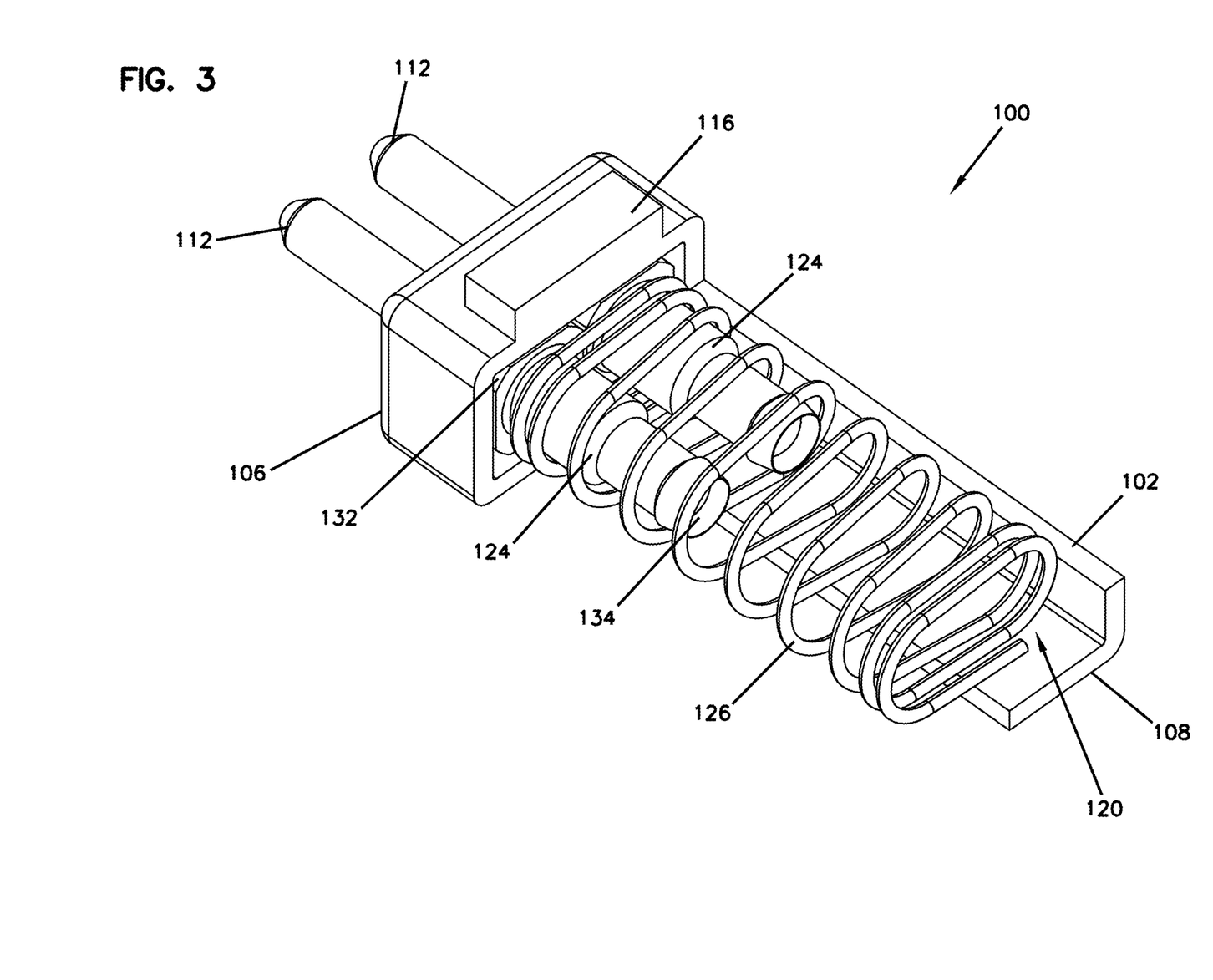
FIG. 3 is an interior perspective view of the fiber optic connector shown in FIG. 1 with a portion of the connector housing removed for ease in viewing.

FIG. 2 is an exploded perspective view of the fiber optic connector 100. FIG. 3 is an interior perspective view of the fiber optic connector 100 with a portion of the connector housing removed for ease in viewing. Referring concurrently to FIGS. 2-3, the connector housing 102 has a generally rectangular outer profile such that an interior cavity 120 is formed by the housing 102. The distal end 106 of the connector housing 102 has one or more apertures 122 that receive the ferrules 112 such that the ferrules 112 may extend from the connector housing 102. In certain examples, the distal end 106 defines a corresponding aperture 122 for each of the ferrules 112. Each ferrule assembly 110 includes the ferrule 112 and a ferrule hub 124 that receives and secures an optical fiber. The connector 100 also includes a ferrule spring 126. The ferrule hubs 124 and the ferrule spring 126 are disposed within the interior cavity 120 of the connector housing 102.

Each ferrule 112 extends parallel to the longitudinal axis 104 with a distal end 128 that projects distally outwardly beyond the distal end 106 of the connector housing 102. A proximal end 130 of the ferrule 112 is secured within the ferrule hub 124 and captured within the connector housing 102. Each ferrule hub 124 also extends parallel to the longitudinal axis 104 with a distal end 132 that secures the ferrule 112 and forms a shoulder. A proximal end 134 of the ferrule hub 124 is sized and shaped to be received within the ferrule spring 126 so that the shoulder of the distal end 132 may engage with the ferrule spring 126. The ferrule spring 126 is configured to bias the ferrules 112 in a distal direction parallel to the longitudinal axis 104 relative to the connector housing 102 via the ferrule hubs 124.

In the example, each ferrule hub 124 is discrete from one another so that each ferrule 112 may be independently moved along the longitudinal axis 104. However, the ferrule spring 126 surrounds each proximal end 134 of the ferrule hubs 124 such that each hub 124 is engaged with the ferrule spring 126. As such, the longitudinal movement of each ferrule 112 and hub 124 combination (e.g., the ferrule assembly 110) is partially independent. That is, one ferrule may be able to move independently from the other ferrule along the longitudinal axis 104. The flex of the ferrule spring 126 enables partial independent movement of each ferrule hub 124 even though all of the ferrule hubs 124 are engaged and biased by the same ferrule spring 126. This facilitates physical contact of ferrule end-faces even when ferrules are uneven in the fiber optic cable connection.

Figure 4:
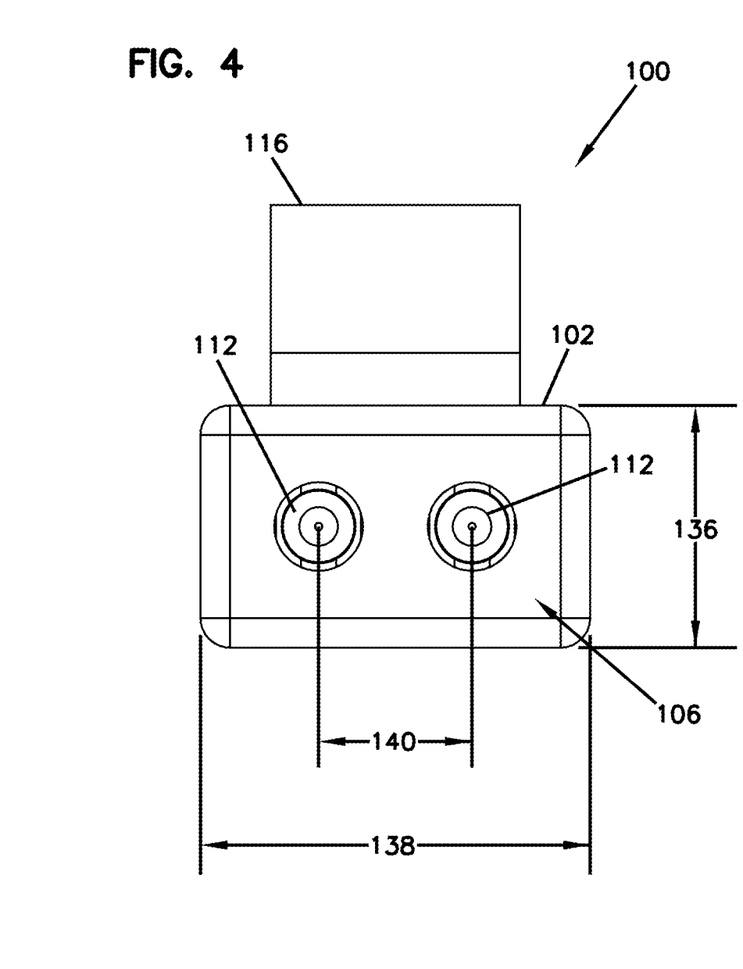
FIG. 4 is a front view of the fiber optic connector shown in FIG. 1.
Figure 5:
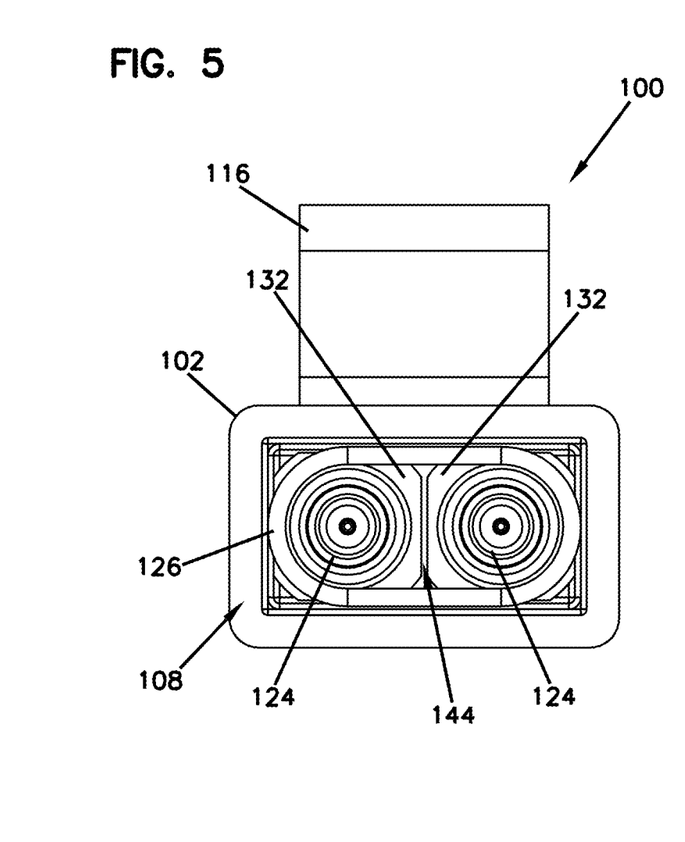
FIG. 5 is a rear view of the fiber optic connector shown in FIG. 1.

FIG. 4 is a front view of the fiber optic connector 100. FIG. 5 is a rear view of the fiber optic connector 100. Referring concurrently to FIGS. 4 and 5, the connector housing 102 is substantially rectangular-shaped in cross-section with a height 136 that is shorter than a width 138. In the example, the ferrules 112 are duplex and spaced 140 a predetermined distance apart at the distal end 106 of the connector housing 102 along the width 138. As such, the ferrules 112 are stacked horizontally within the connector housing 102. Since the ferrules 112 are considered to be adjacent to each other and stacked horizontally, the latch 116 extends from the width 138 of the connector housing 102 and at the top. In the example, the ferrules 112 are sized such that the fiber optic connector 100 may be a LC style connector. However, the connector housing 102 and ferrule assembly 110 configuration as described herein may be used in any other style multiplex connector as required or desired.

The proximal end 108 of the connector housing 102 is open so that optical fibers 142 of the fiber optic cable 114 (shown in FIG. 6) may extend to the ferrules 112. In the example, the optical fibers extend through to the ferrule hubs 124 and are surrounded by the ferrule spring 126. The distal end 132 of each ferrule hub 124 is substantially square-shaped and spaced apart from one another such that each ferrule hub 124 is discrete and a gap 144 is formed therebetween. As such, the longitudinal movement of each ferrule 112 and hub 124 combination (e.g., the ferrule assembly 110) is partially independent as described above. In the example, each ferrule hub 124 is positioned adjacent to one another without walls or any other component separating the hubs 124 within the connector housing 102. As such, the distal end 132 of each ferrule hub 124 face each other with the gap 144 therebetween. Additionally, the ferrule hubs 124 and the ferrule spring 126 are all disposed together within the connector housing 102 so as to reduce the size of the connector housing 102. In alternative examples, each ferrule hub 124 may be positioned adjacent to one another without a gap therebetween. By reducing the space between the ferrule hubs 124, the size of the connector housing 102 is reduced, thereby enabling more connectors to be used in a smaller space.

Figure 6:
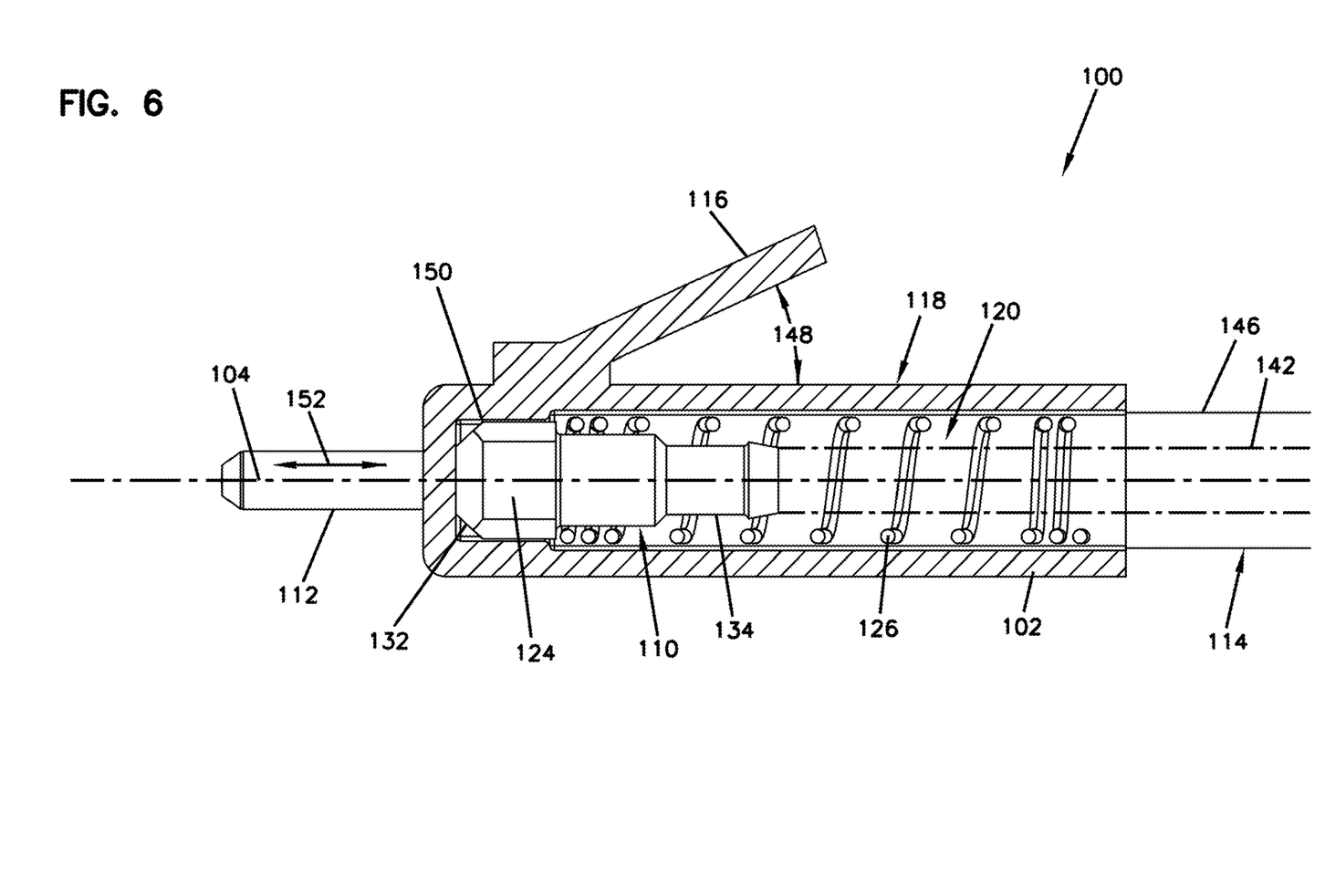
FIG. 6 is an axial cross-sectional view of the fiber optic connector shown in FIG. 1.

FIG. 6 is a cross-sectional view of the fiber optic connector 100 taken along the longitudinal axis 104. As illustrated, the fiber optic connector 100 is coupled to an end of the fiber optic cable 114. The fiber optic cable 114 may include a cover sheathing (e.g., outer jacket) 146 that surrounds a plurality of optical fibers 142. Each optical fiber 142 is secured to the ferrule assembly 110 so that the fiber optic connector 100 may be used optically connect the optical fiber 142 to another optical fiber or equipment. For example, each optical fiber 142 may be terminated at a respective one of the ferrules 112.

The latch 116 extends at an angle 148 from the exterior surface 118 and above the ferrule assembly 110. At the distal end 106 of the connector housing 102, a seat 150 is defined such that the distal ends 132 of the ferrule hubs 124 are slidingly disposed therein. The seat 150 enables the distal ends 132 of the ferrule hubs 124 to be positioned within the interior cavity 120 so that the ferrule spring 126 may surround the proximal ends 134 of the ferrule hubs 124 and the optical fibers 142. The distal ends 132 of the ferrule hubs 124 may also be tapered so as to more easily be positioned within the seat 150 upon longitudinal movement of the ferrule hubs 124.

The ferrule spring 126 biases the ferrules 112 and the ferrule hubs 124 (e.g., the ferrule assembly 110) in a distal position as illustrated in FIG. 6. In operation, the ferrules 112 are moveable (see arrow 152) relative to the connector housing 102 along a respective insertion axis between distal and proximal positions. The ferrules 112 may be moved in a proximal direction along the respective insertion axis against the bias of the ferrule spring 126. The distal and proximal positions are separated by a displacement distance defined along the respective insertion axis.

Figure 7:
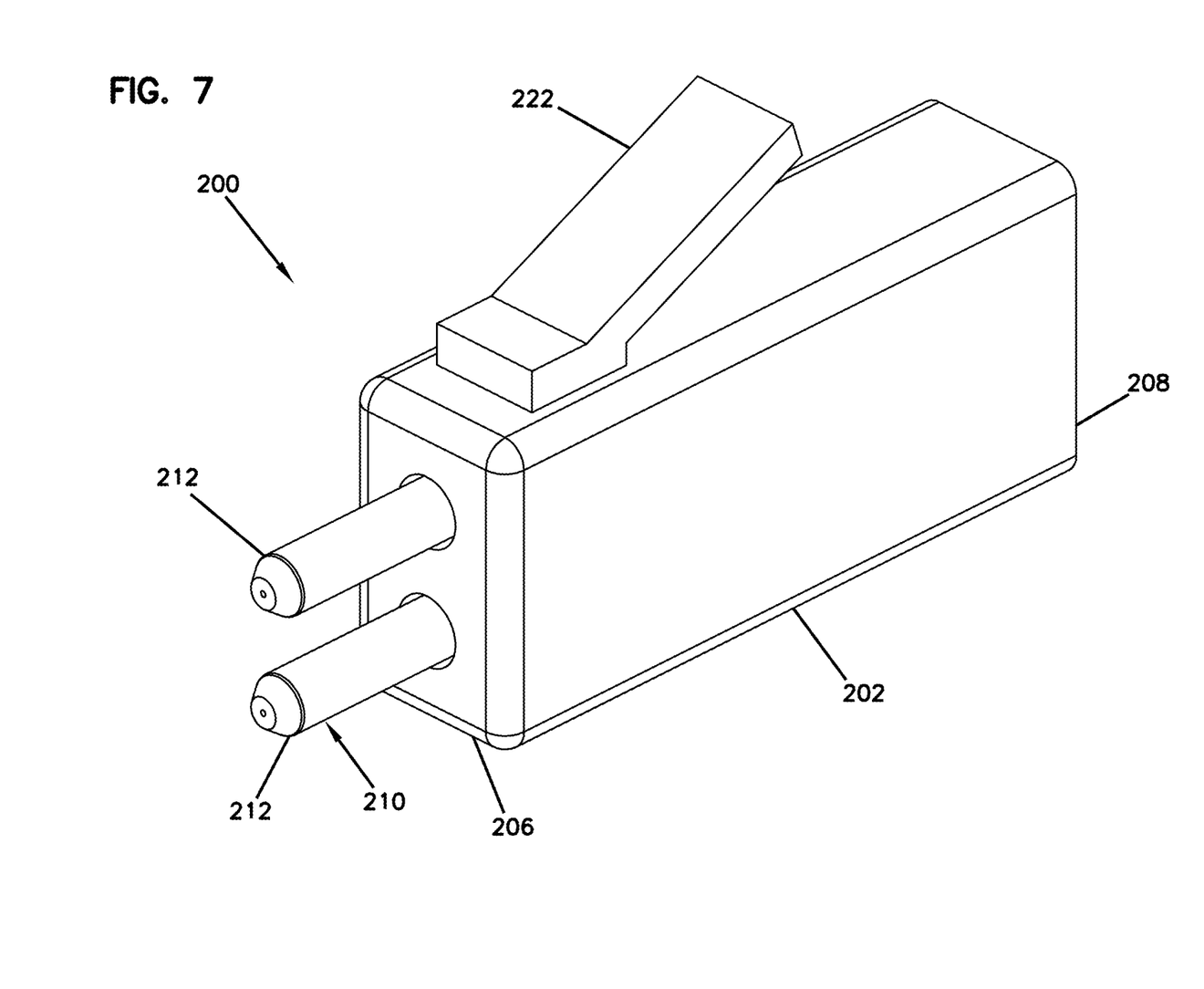
FIG. 7 is a perspective view of another fiber optic connector configured in accordance with the principles of the present disclosure.
Figure 8:
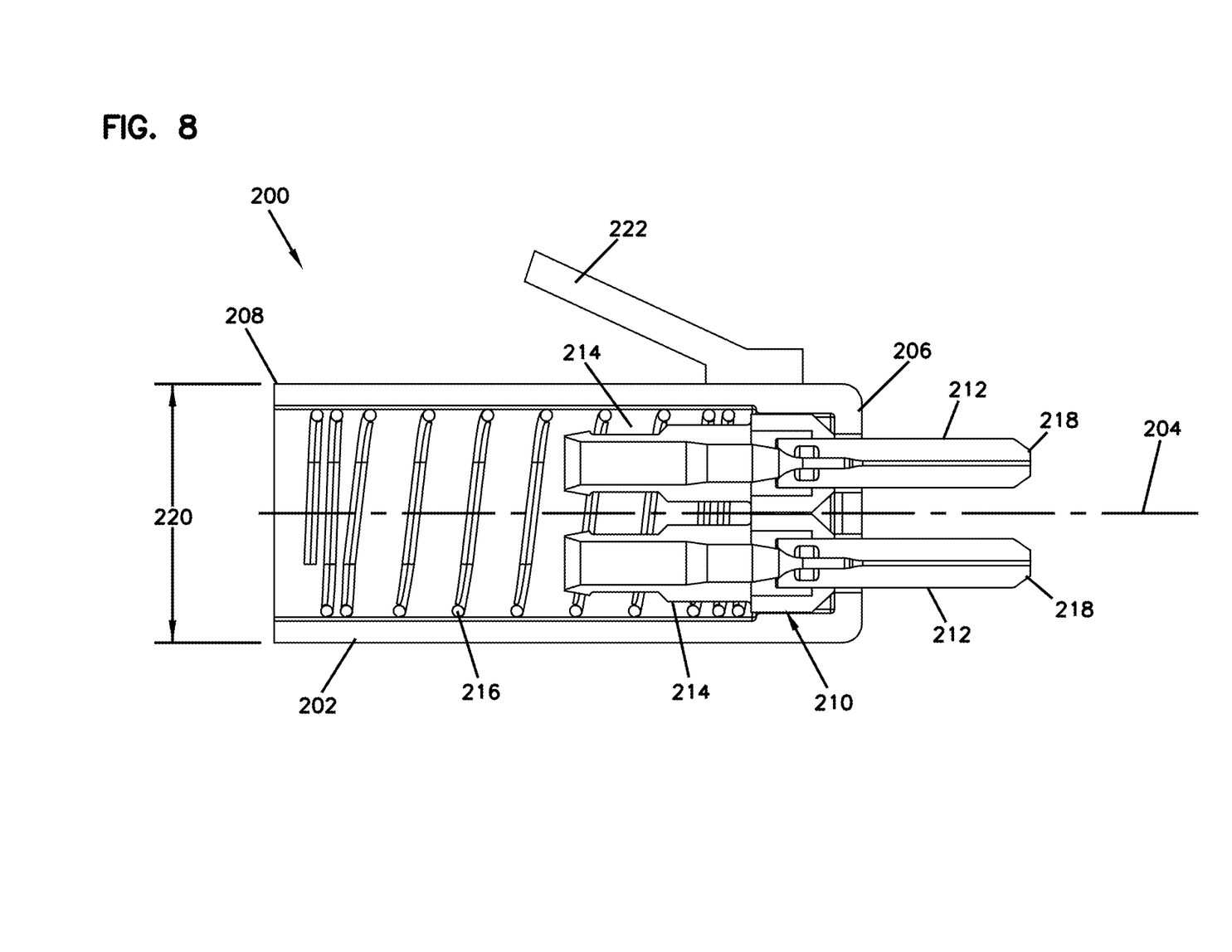
FIG. 8 is an axial cross-sectional view of the fiber optic connector shown in FIG. 7.

FIG. 7 is a perspective view of another fiber optic connector 200. FIG. 8 is a cross-sectional view of the fiber optic connector 200. Referring concurrently to FIGS. 7 and 8, the fiber optic connector 200 includes a connector housing 202 defining a longitudinal axis 204 and having a distal end 206 and an opposite proximal end 208. A plurality of ferrule assemblies 210 are partially disposed within the connector housing 202 and include a ferrule 212 and a corresponding ferrule hub 214. The connector 200 also includes a ferrule spring 216. Each ferrule 212 extends parallel to the longitudinal axis 204 with a distal end 218 that projects distally outwardly beyond the distal end 206 of the connector housing 202, as described above in reference to FIGS. 1-6. However, in this example, the connector housing 202 is substantially rectangular-shaped in cross-section with a height 220 that is greater than a width. For example, the ferrules 212 are duplex and spaced a predetermined distance apart along the height 220. As such, the ferrules 212 are stacked vertically within the connector housing 202. Since the ferrules 212 are considered to be adjacent to each other and stacked vertically, a latch 222 extends from the top of the connector housing 202. In the example, the ferrules 212 are sized such that the fiber optic connector 200 may be a LC style connector. However, the connector housing 202 and ferrule assembly 210 configuration as described herein may be used in any other style multiplex connector as required or desired.

Figure 9:
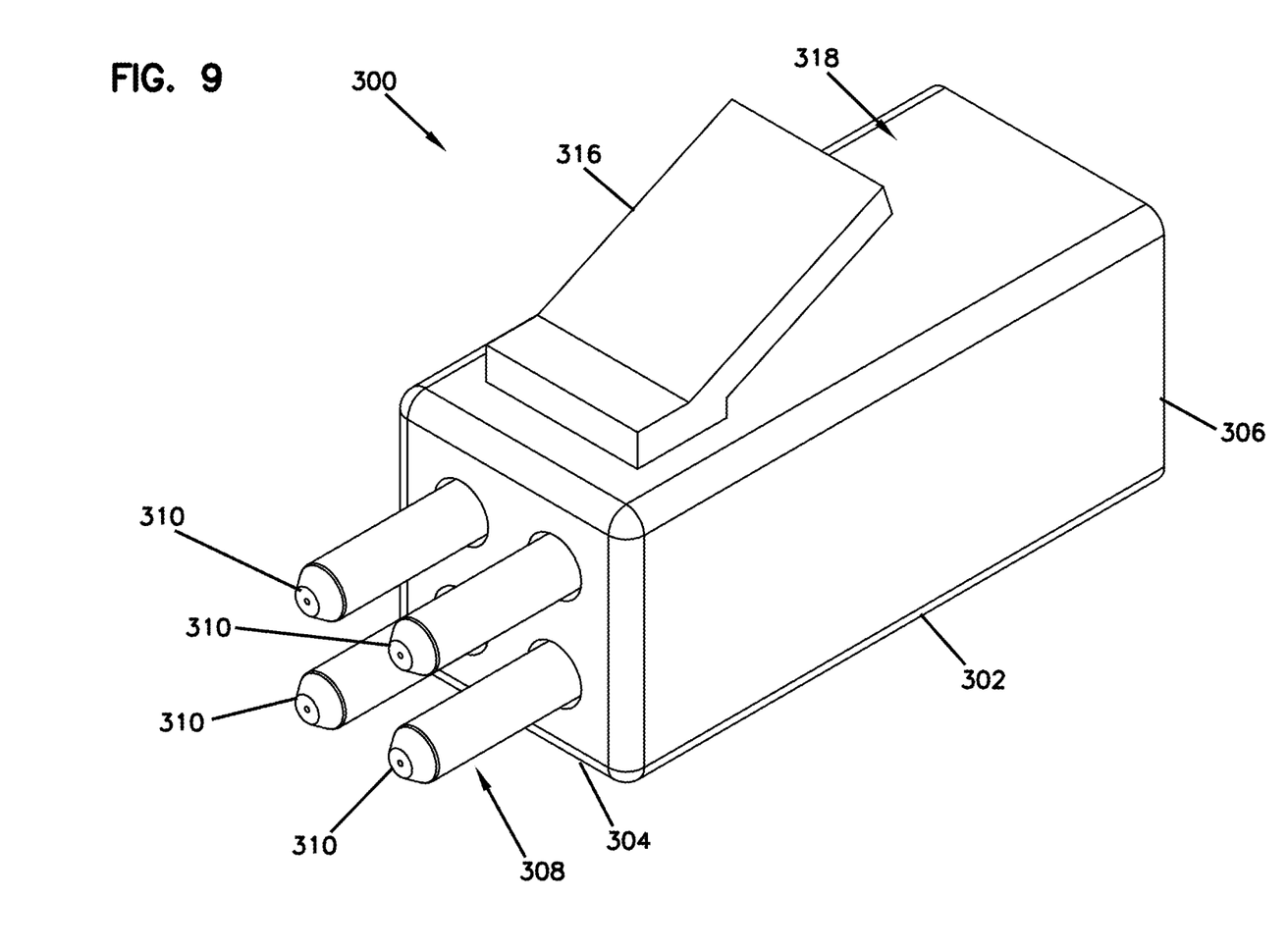
FIG. 9 is a perspective view of another fiber optic connector configured in accordance with the principles of the present disclosure.
Figure 10:
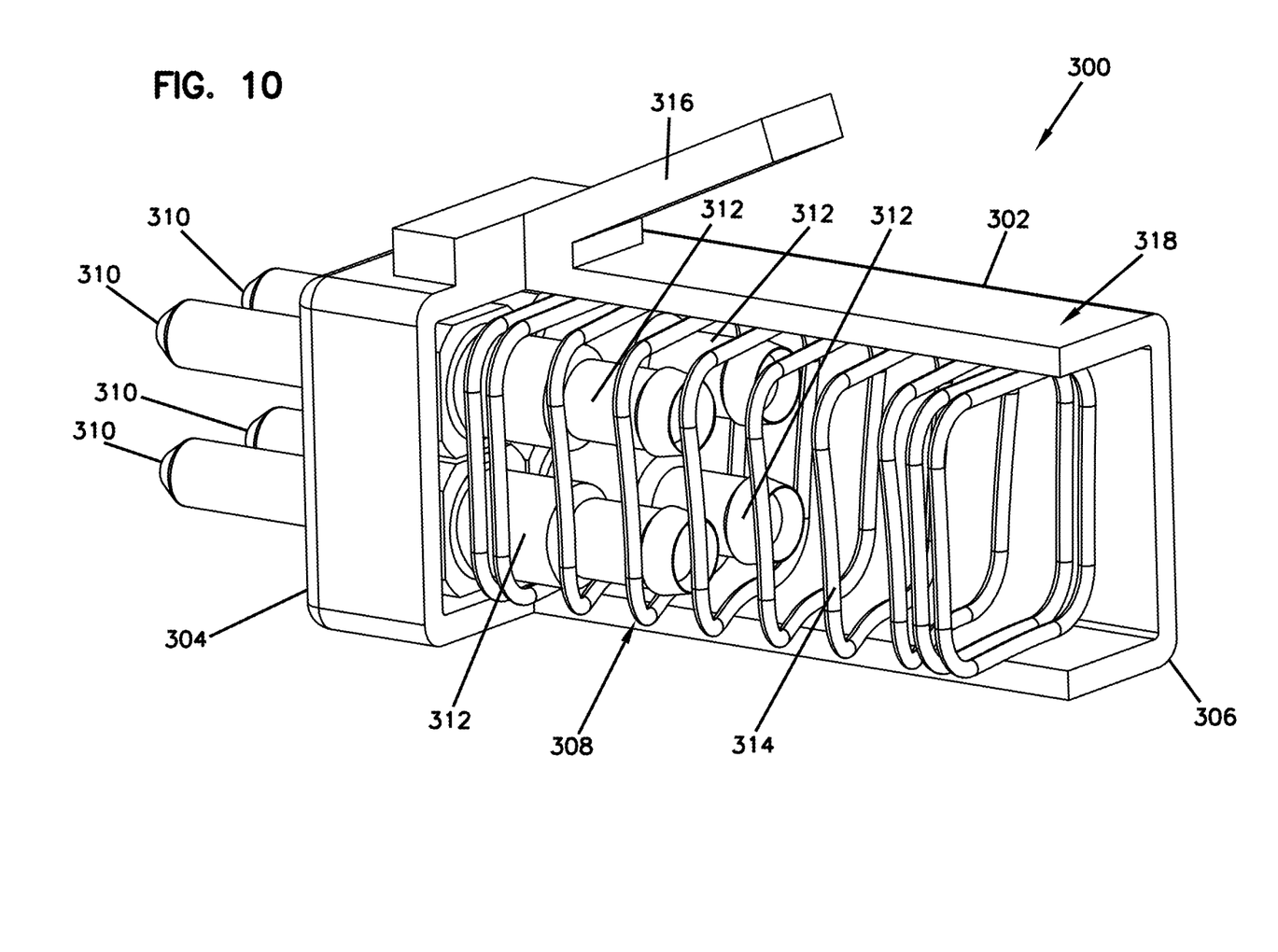
FIG. 10 is an interior perspective view of the fiber optic connector shown in FIG. 9 with part of the connection housing removed for ease in viewing.

FIG. 9 is a perspective view of another fiber optic connector 300. FIG. 10 is an interior perspective view of the fiber optic connector 300 with part of the connector housing removed for ease in viewing. Referring concurrently to FIGS. 9 and 10, the fiber optic connector 300 includes a connector housing 302 having a distal end 304 and an opposite proximal end 306. A plurality of ferrule assemblies 308 are partially disposed within the connector housing 302 and include a ferrule 310 and a corresponding ferrule hub 312. The connector 300 also includes a ferrule spring 314. Each ferrule 310 projects distally outwardly beyond the distal end 304 of the connector housing 302 as described in the examples above. Additionally, a latch 316 extends from a top surface 318 of the connector housing 302. However, in this example, the fiber optic connector 300 has four ferrules 310 and an outer profile that is defined by a generally square configuration.

Figure 11:
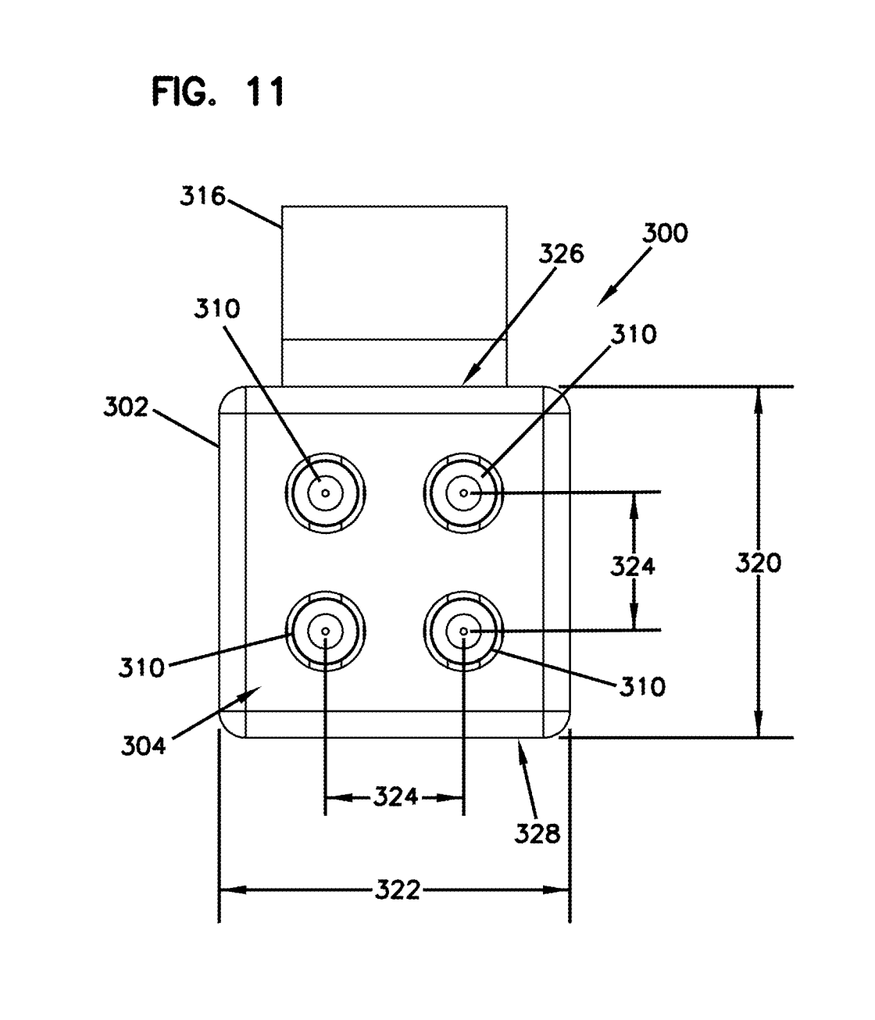
FIG. 11 is a front view of the fiber optic connector shown in FIG. 9.
Figure 12:
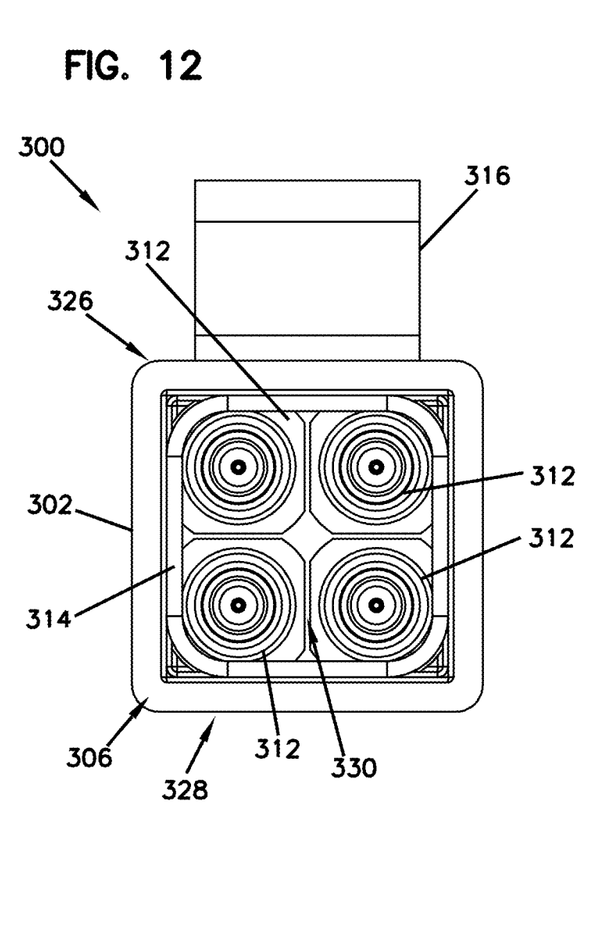
FIG. 12 is a rear view of the fiber optic connector shown in FIG. 9.

FIG. 11 is a front view of the fiber optic connector 300. FIG. 12 is a rear view of the fiber optic connector 300. Referring concurrently to FIGS. 11 and 12, the connector housing 302 is substantially square-shaped in cross-section with a height 320 that is approximately equal to a width 322. In the example, the ferrules 310 are quadplex and spaced 324 a predetermined distance apart in a grid configuration at the distal end 304 of the connector housing 302. In other examples, the spacing 324 between the upper and lower ferrules may be different than the spacing 324 between the left and right ferrules. As such, the ferrules 310 are stacked both horizontally and vertically within the connector housing 302 with two positioned towards a top 326 of the connector housing 302 and two positioned towards a bottom 328 of the connector housing 302. In the example, the ferrules 310 are sized such that the fiber optic connector 300 may be a LC style connector. However, the connector housing 302 and ferrule assembly 308 configuration as described herein may be used in any other style connector as required or desired.

In the example, a portion of each ferrule hub 312 is substantially square-shaped and spaced apart from one another such that each ferrule hub 312 is discrete and a gap 330 is formed therebetween. In this example, the gap 330 is approximately equal between all four ferrule hubs 312. In other examples, the gaps between the upper and lower ferrule hubs may be different than the gaps between the left and right ferrule hubs. In yet other examples, the upper ferrule hubs may be coupled together and discrete from the lower ferrule hubs that may be coupled together, or the left ferrule hubs may be coupled together and discrete from the right ferrule hubs that may be coupled together. Additionally, the ferrule spring 314 surrounds a portion of each of the four ferrule hubs 312 so as to bias the ferrules 310 in a distal position as described above. In alternative examples, more than one ferrule spring may be used such the upper and lower ferrule hubs or left and right ferrule hubs may each have separate biasing springs. In further examples, the connector may have any other numbers of ferrules forming the ferrule assembly as required or desired.

In this example, each ferrule hub 312 is positioned adjacent to one another without walls or any other component separating the hubs 312 within the connector housing 302. As such, a portion of each ferrule hub 312 faces each other with the gap 330 therebetween. Additionally, the ferrule hubs 312 and the ferrule spring 314 are all disposed together within the connector housing 302 so as to reduce the size of the connector housing 302. In alternative examples, each ferrule hub 312 may be positioned adjacent to one another without a gap therebetween. By reducing the space between the ferrule hubs 312, the size of the connector housing 302 is reduced, thereby enabling more connectors to be used in a smaller space.

Although in the foregoing description, terms such as "top," "bottom," "front," "back," "rear," "right," "left," "upper," and "lower" may have been used for ease of description and illustration, no restriction is intended by such use of the terms. The connectors described herein can be used in any orientation, depending upon the desired application.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. An optical fiber connector comprising:
a connector housing having a longitudinal axis extending between a distal end of the connector housing and a proximal end of the connector housing, the connector housing defining an interior cavity; and
a ferrule assembly coupled to the connector housing, the ferrule assembly including:
a plurality of ferrules extending parallel to the longitudinal axis, each ferrule of the plurality of ferrules extending between respective proximal and distal ends, the proximal ends of the ferrules being disposed within the interior cavity, the distal ends of the ferrules being accessible at the distal end of the connector housing, the plurality of ferrules being movable relative to the connector housing along a respective insertion axis that is parallel with the longitudinal axis; and
a ferrule spring disposed within the interior cavity, the ferrule spring at least partially surrounding each of a plurality of ferrule hubs of the plurality of ferrules, the ferrule spring biasing the plurality of ferrules in a distal direction relative to the connector housing, a proximal movement of the plurality of ferrules being against the bias of the ferrule spring.

2. The optical fiber connector of claim 1, wherein the ferrule hubs are disposed within the interior cavity, each ferrule hub being coupled to the proximal end of one of the ferrules, the ferrule spring biasing the ferrules via the ferrule hubs.

3. The optical fiber connector of claim 2, wherein the ferrule hubs are discrete from one another.

4. The optical fiber connector of claim 2, wherein the distal end of the connector housing defines an internal shoulder that inhibits distal movement of the plurality of ferrule hubs out of the interior cavity of the connector housing.

5. The optical fiber connector as in claim 2, wherein each ferrule hub of the plurality of ferrule hubs is separated by a gap.

6. The optical fiber connector as in claim 2, wherein the ferrule hubs are not laterally separated from each other by the connector housing.

7. The optical fiber connector as in claim 1, wherein the fiber optic connector is a multiplex connector.

8. The optical fiber connector of claim 1, wherein the fiber optic connector is a duplex connector.

9. The optical fiber connector of claim 1, wherein the fiber optic connector is a quadplex connector.

10. The optical fiber connector as in claim 1, wherein the connector housing has a smaller internal cross-dimension at the distal end compared to the proximal end.

11. An optical fiber connector comprising:
a connector housing defining an interior cavity;
a plurality of ferrules each having a proximal end disposed within the interior cavity and a distal end extending from the connector housing;
a plurality of discrete ferrule hubs each disposed at the proximal end of one of the ferrules, wherein no structure is disposed between the discrete ferrule hubs; and
a ferrule spring surrounding at least a portion of the plurality of ferrule hubs, the plurality of ferrule hubs and the ferrule spring being disposed together within the interior cavity, and the ferrule spring distally biasing each ferrule relative to the connector housing via the respective ferrule hub.

12. The optical fiber connector of claim 11, wherein each ferrule is movable along a respective insertion axis relative to the connector housing from a distal position to a proximal position, the ferrule spring biasing each ferrule towards the distal position.

13. The optical fiber connector as in claim 11, wherein adjacent ones of the ferrule hubs are separated by an empty gap within the interior cavity.

14. The optical fiber connector as in claim 11, wherein the fiber optic connector is a duplex style connector.

15. The optical fiber connector as in claim 11, wherein the fiber optic connector is a quadruplex style connector.

16. The optical fiber connector of claim 15, wherein at least a portion of an outer profile of the connector housing defines a generally square configuration.

17. A fiber optic connector and cable assembly comprising:
a cable including a plurality of optical fibers; and
an optical fiber connector terminating an end of the cable, the optical fiber connector including:
a connector housing defining an interior cavity having a first cross-dimension; and
a ferrule assembly disposed at least partially within the connector housing, the ferrule assembly comprising:
a plurality of ferrules extending along longitudinal axes, each of the ferrules terminating one of the optical fibers, each of the ferrules having a distal end that extends from the connector housing;
a plurality of ferrule hubs, each ferrule hub being discrete and disposed at a proximate end of a respective one of the ferrules, the ferrule hubs being a) separated by an empty gap; or b) abutting each other; and
a ferrule spring surrounding at least a portion of the plurality of ferrule hubs and a plurality of the optical fibers of the cable;
wherein the plurality of ferrule hubs and the ferrule spring are disposed together within the interior cavity, and the ferrule spring biases each ferrule along the respective longitudinal axis relative to the connector housing via each ferrule hub.

18. The fiber optic connector and cable assembly of claim 17, wherein the optical fiber connector further comprises a latch extending from an exterior surface of the connector housing.

19. The optical fiber connector and cable assembly of claim 17, wherein the fiber optic connector is a multiplex connector.

* * * * *